United States Patent [19]
Konno et al.

[11] Patent Number: 5,111,045
[45] Date of Patent: May 5, 1992

[54] APPARATUS FOR RECORDING AND READING RADIATION IMAGE INFORMATION

[75] Inventors: Masaaki Konno; Yasuhiro Kawai, both of Kanagawa, Japan

[73] Assignee: Fuji Photo Film Co., Ltd., Kanagawa, Japan

[21] Appl. No.: 679,399

[22] Filed: Apr. 2, 1991

[30] Foreign Application Priority Data

Apr. 3, 1990 [JP] Japan ..................... 2-88734

[51] Int. Cl.$^5$ ............................................. G01N 23/04
[52] U.S. Cl. ............................................. 250/327.2
[58] Field of Search ....................... 250/327.2, 484.1

[56] References Cited

U.S. PATENT DOCUMENTS

| 4,543,479 | 9/1985 | Kato | 250/327.2 |
| 4,947,043 | 8/1990 | Shimura | 250/327.2 |

FOREIGN PATENT DOCUMENTS

| 55-12429 | 1/1980 | Japan . |
| 55-116340 | 9/1980 | Japan . |
| 55-163472 | 12/1980 | Japan . |
| 56-11392 | 2/1981 | Japan . |
| 56-11395 | 2/1981 | Japan . |
| 56-12599 | 2/1981 | Japan . |
| 56-104645 | 8/1981 | Japan . |
| 59-192240 | 10/1984 | Japan . |

Primary Examiner—Carolyn E. Fields
Assistant Examiner—Drew A. Dunn
Attorney, Agent, or Firm—Sughrue, Mion, Zinn, Macpeak & Seas

[57] ABSTRACT

An apparatus for recording and reading radiation image information includes an image recording unit, an image reading unit, and an erasing unit. Radiation image information of an object such as a human body is recorded on a stimulable phosphor sheet in the image recording unit, and the recorded radiation image information is read from the stimulable phosphor sheet in the image reading unit. After the recorded radiation image information has been read, any residual radiation image information is erased from the stimulable phosphor sheet. When the radiation image information of an object of large size, e.g., a vertebral column, is to be recorded, first and second stimulable phosphors are successively positioned in the image recording unit with their confronting ends superimposed on each other in a recording position.

7 Claims, 5 Drawing Sheets

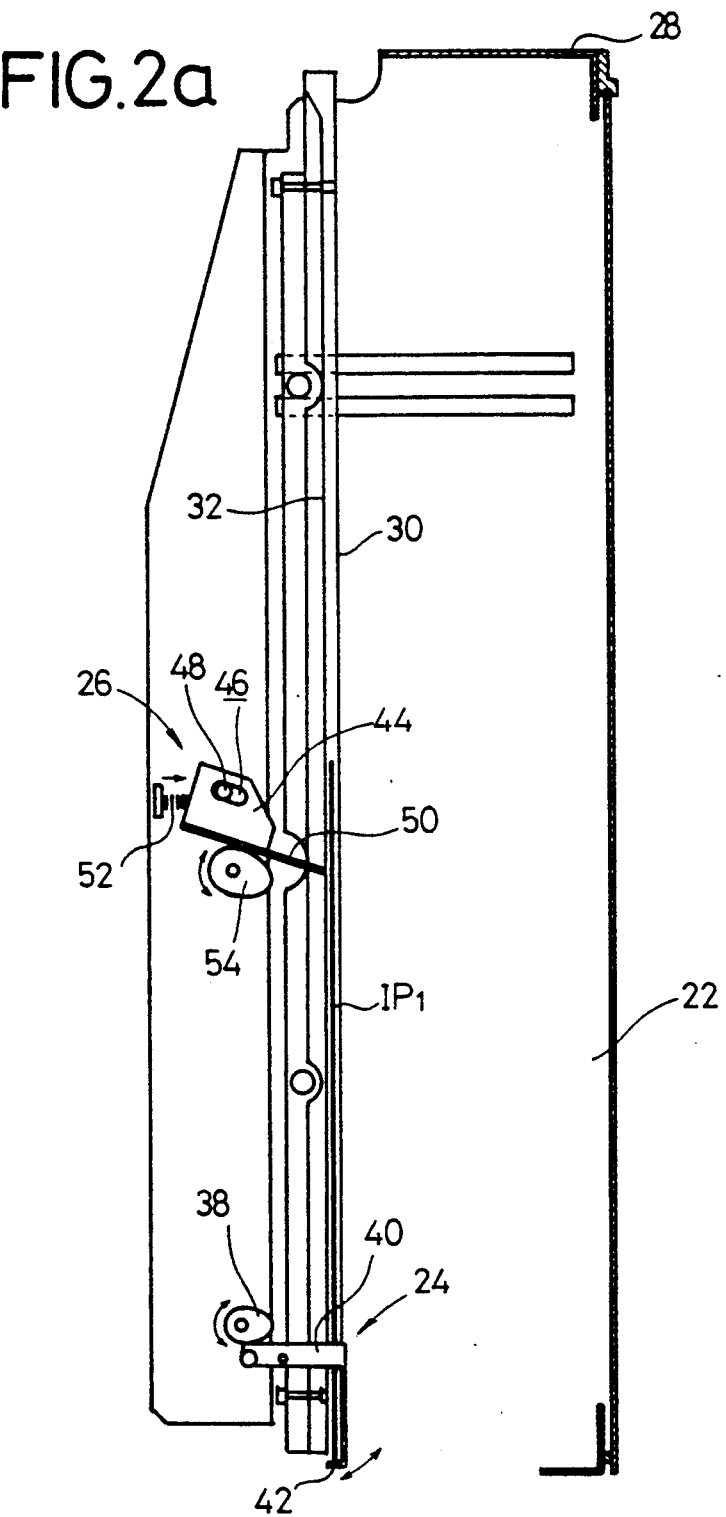

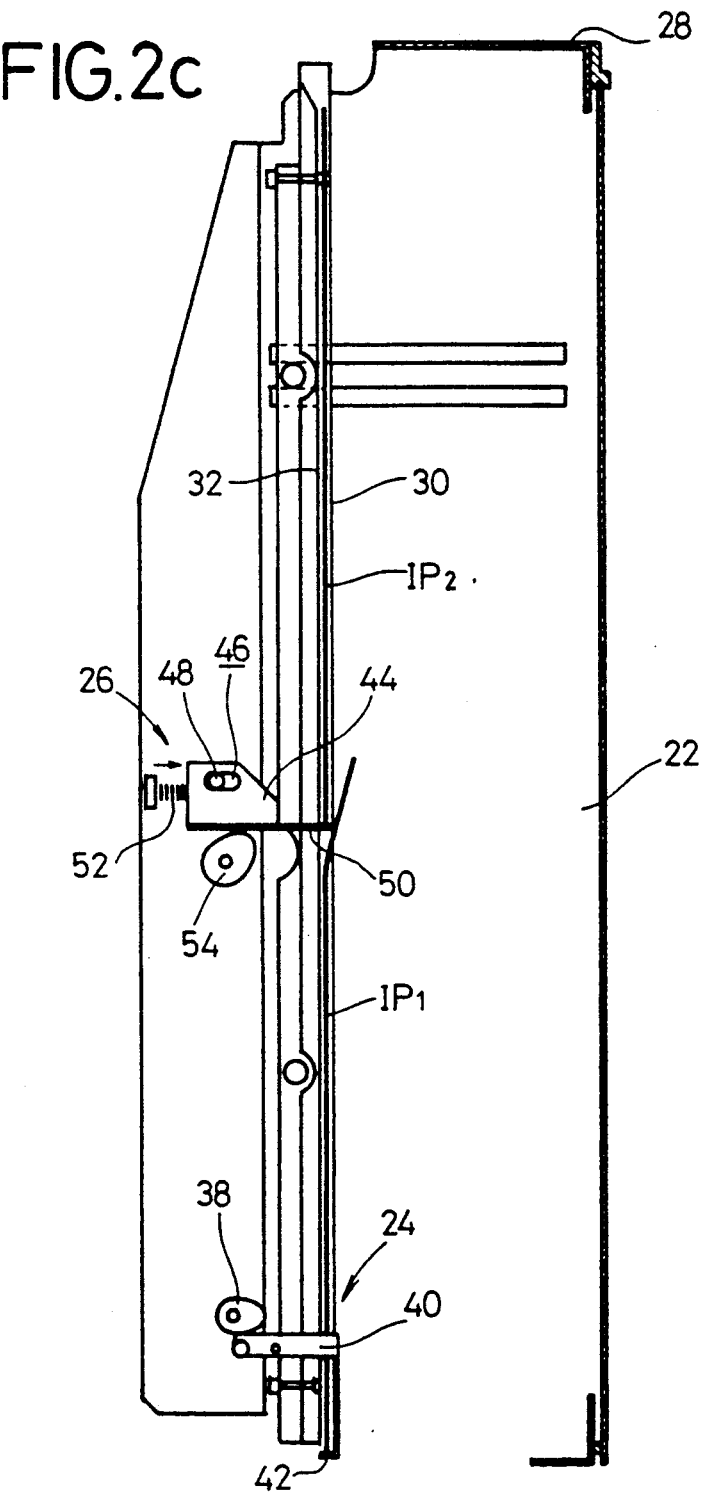

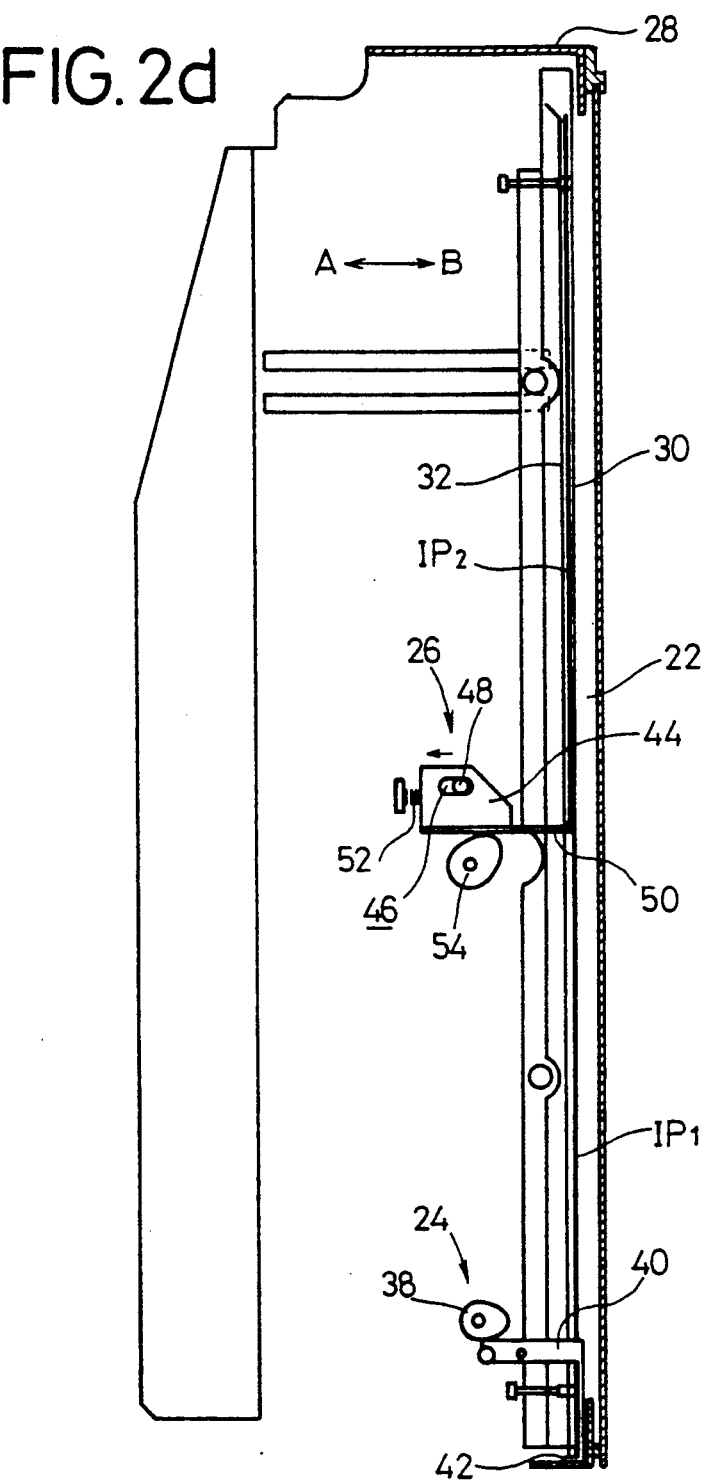

APPARATUS FOR RECORDING AND READING RADIATION IMAGE INFORMATION

BACKGROUND OF THE INVENTION

The present invention relates to a radiation image information recording and reading apparatus which is capable of recording a radiation image on two stimulable phosphor sheets whose ends are superimposed on each other.

Recently there have recently been developed radiation image information recording and reproducing systems for recording the radiation image of an object, such as a human body, on a stimulable phosphor sheet. Such devices scan the stimulable phosphor sheet with stimulating light to cause it to emit light, photoelectrically read the emitted light to produce an image signal, and processing the image signal to obtain a radiation image of the object which may be used for medical diagnosis (see, for example, Japanese Laid-Open Patent Publications Nos. 55-12429, 56-11395, 55-163472, 56-104645, 55-116340, etc).

In these radiation image information recording and reproducing systems, the final radiation image may be reproduced as either a hard copy image or a visible image on a CRT. The stimulable phosphor sheet employed in those systems is not a final image carrier for recording image information, but a temporary image carrier from which image information will eventually be transferred to a suitable recording medium. Therefore, the stimulable phosphor sheet may be repeatedly used, and such repeated use of the stimulable phosphor sheet is highly economical.

In order to use a stimulable phosphor sheet again, any residual radiation energy that may remain on the stimulable phosphor sheet from which the emitted light has been read is discharged according to the process disclosed in Japanese Laid-Open Patent Publications Nos. 56-11392 and 56-12599, for example. After the residual radiation image has been erased, the stimulable phosphor sheet may be used for recording additional radiation images.

There has been proposed a built-in type radiation image information recording and reading apparatus in which a stimulable phosphor sheet is circulated for repetitive use, as disclosed in Japanese Laid-Open Patent Publication No. 59-192240. More specifically, the proposed apparatus utilizes a circulatory feed mechanism for feeding, along a circulatory path, a stimulable phosphor sheet which can record a radiation image. An image recording unit is disposed in the circulatory path for applying a radiation bearing radiation image information of an object to the stimulable phosphor sheet so as to record the radiation image information on the stimulable phosphor sheet. An image reading unit is also disposed in the circulatory path and includes a stimulating light source for emitting stimulating light to scan the stimulable phosphor sheet on which the radiation image information has been recorded by the image recording unit. A photoelectric reading device reads light emitted from the stimulable phosphor sheet scanned by the stimulating light to produce an image signal indicative of the recorded radiation image information, and an erasing unit is disposed in the circulatory path for discharging any residual radiation energy from the stimulable phosphor sheet before new radiation image information is recorded on the stimulable phosphor sheet and after the previous radiation image information has been read by the photoelectric reading means. The stimulable phosphor sheet is circulated along the circulatory path through the image recording unit, the image reading unit, and the erasing unit for repetitive use.

The proposed radiation image information recording and reading apparatus allows successive items of radiation image information to be recorded and read efficiently.

The built-in type radiation image information recording and reading apparatus is designed to record radiation image information with respect to various body parts of patients, including the chest, abdomen, limbs, etc. Stimulable phosphor sheets used to record such radiation image information are selected in sizes (e.g., a half size) depending on the body parts to be recorded.

There is a recent demand for the diagnosis of entire vertebral columns using a built-in type radiation image information recording and reading apparatus. To diagnose an entire vertebral column using a built-in type radiation image information recording and reading apparatus, the image of the vertebral column may be divided into two portions, which are recorded respectively on two stimulable phosphor sheets. However, the recording process is complex and inefficient since two different parts of the vertebral column must be recorded independently. If the patient moves while the image recording unit is moving after one image has been recorded, then an accurate subsequent image would not be recorded, and hence a correct diagnosis could not be carried out.

SUMMARY OF THE INVENTION

It is an object of the present invention to provide a radiation image information recording and reading apparatus which can easily and efficiently record a large object, such as an entire vertebral column, allowing the object to be diagnosed correctly based on the recorded radiation image information.

According to the present invention, there is provided an apparatus for recording and reading radiation image information, having an image recording unit for applying a radiation bearing radiation image information to a stimulable phosphor sheet to record the radiation image information on the stimulable phosphor sheet in a recording position. An image reading unit applies stimulating light to the stimulable phosphor sheet on which the radiation image information has been recorded and photoelectrically reads light emitted from the stimulable phosphor sheet. An erasing unit discharges any residual radiation energy from the stimulable phosphor sheet before new radiation image information is recorded on the stimulable phosphor sheet after and the previous radiation image information has been read by the image reading unit. And a feed device is used for feeding the stimulable phosphor sheets circulatively through the image recording unit, the image reading unit, and the erasing unit. The image recording unit also has a first engaging device for engaging one end of a first stimulable phosphor sheet to position the first stimulable phosphor sheet in the recording position, and second engaging device for engaging one end of a second stimulable phosphor sheet to position the second stimulable phosphor sheet in the recording position while holding the one end of the second stimulable phosphor sheet in superimposed relationship to the other end of the first stimulable phosphor sheet.

The image recording unit includes a displacing mechanism for displacing the stimulable phosphor sheets between a receiving position in which the stimulable phosphor sheets are received from the feed means and the recording position in which the radiation is applied to the stimulable phosphor sheets, the first and second engaging devices are mounted on the displacing mechanism.

The displacing mechanism consists of a pair of plates for sandwiching the stimulable phosphor sheets therebetween, and a link mechanism for moving the plates between the receiving position and the recording position.

The first engaging means consists of an actuator, a swing arm angularly movable by the actuator, and a support on an end of the swing arm for supporting the first stimulable phosphor sheet. The actuator has a rotative drive source and a cam rotatable by the rotative drive source and engageable with the swing arm.

The second engaging means consist of an actuator, a swing plate angularly movable by the actuator, a support on the swing plate for supporting the second stimulable phosphor sheet, and a resilient member for urging the support to press the other end of the first stimulable phosphor sheet toward the recording position when the second stimulable phosphor sheet is supported on the support. The actuator has a rotative drive source and a cam rotatable by the rotative drive source and engageable with the swing plate.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2a through 2d are schematic vertical cross-sectional views showing a progressive process of operation of certain components in an image recording unit of the radiation image information recording and reading apparatus shown in FIG. 1.

DETAILED DESCRIPTION OF THE PREFERRED EMBODIMENT

Figure 1:
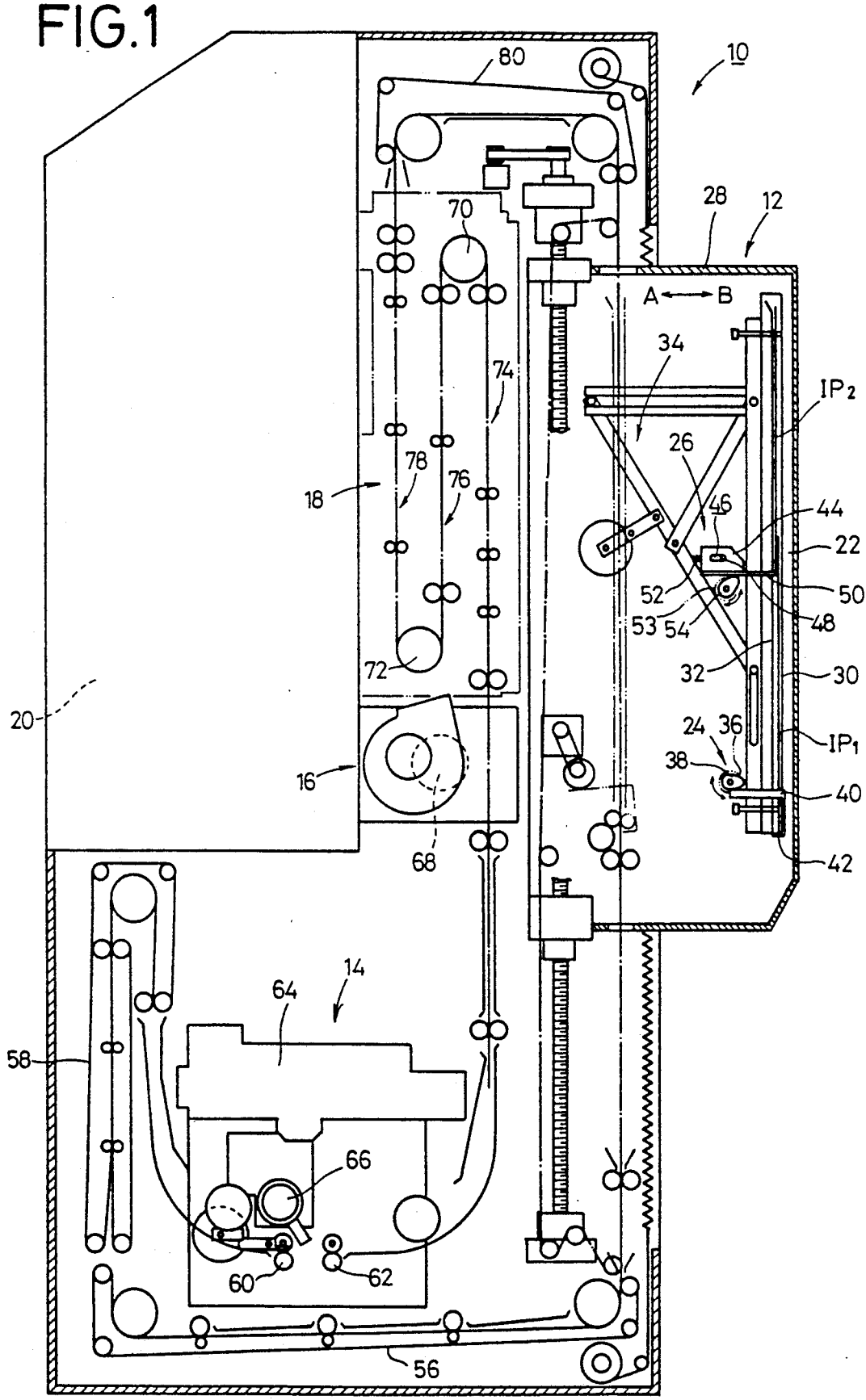
FIG. 1 is a schematic vertical cross-sectional view of a radiation image information recording and reading apparatus according to the present invention.

FIG. 1 shows a radiation image information recording and reading apparatus, generally designated by the reference numeral 10, according to the present invention.

The radiation image information recording and reading apparatus 10 comprises an image recording unit 12 for applying a radiation bearing radiation image information of an object to a stimulable phosphor sheet IP to record the radiation image information on the stimulable phosphor sheet IP, an image reading unit 14 for applying stimulating light to the stimulable phosphor sheet IP on which the radiation image information has been recorded and for photoelectrically reading light emitted from the stimulable phosphor sheet IP, an erasing unit 16 for discharging any residual radiation energy from the stimulable phosphor sheet IP before new radiation image information is recorded on the stimulable phosphor sheet IP after the previous radiation image information has been read by the image reading unit 14, a sheet holding unit 18 for holding stimulable phosphor sheets ready for recording in the image recording unit 12, and a control unit 20.

The image recording unit 12 includes a first engaging mechanism 24 for engaging an end of a first stimulable phosphor sheet IP1 to position the first stimulable phosphor sheet IP1 in a recording position 22, and a second engaging mechanism 26 for engaging an end of a second stimulable phosphor sheet IP2 in superimposed relationship to the other end of the first stimulable phosphor sheet IP1 to position the second stimulable phosphor sheet IP2 in the recording position 22.

The image recording unit 12 has a casing 28 projecting from a front panel of the radiation image information recording and reading apparatus 10 and vertically movable along the front panel thereof. The casing 28 houses therein a link mechanism 34 for displacing front and rear plates 30, 32 in the directions indicated by the arrows A, B while stimulable phosphor sheets IP are being sandwiched between the front and rear plates 30, 32. The link mechanism 34 and the front and rear plates 30, 32 jointly serve as a displacing mechanism.

The first engaging mechanism 24 has a cam 38 rotatable by a rotative drive source 36, and a swing arm 40 engaging the cam 38 at one end and having a support 42 at the other end.

The second engaging mechanism 26 has a swing plate 44 with a guide groove 46 defined therein and receiving a fixed pin 48 secured to the casing 28. The swing plate 44 is connected to a support 50, and is resiliently pressed by a resilient member 52. The support 50 is engaged by a cam 54 which is coupled to a rotative drive source 53.

The image reading unit 14 is operatively coupled to the image recording unit 12 through feed systems 56, 58. The image reading unit 14 comprises two pairs of nip rollers 60, 62 for gripping a stimulable phosphor sheet IP supplied by the feed system 58, an optical unit 64 for applying a laser beam as a scanning beam to the stimulable phosphor sheet IP between the pairs of nip rollers 60, 62, and a transducer unit 66 for photoelectrically reading light which is emitted from the stimulable phosphor sheet IP upon exposure to the laser beam from the optical unit 64, the light being representative of radiation image information recorded on the stimulable phosphor sheet IP.

The erasing unit 16, which is positioned downstream of the image reading unit 14 with respect to the direction in which stimulable phosphor sheets IP are fed, has an erasing light source 68 such as a halogen lamp. Erasing light emitted from the erasing light source 68 is applied to the stimulable phosphor sheet IP coming from the image reading unit 14 to erase any residual radiation image information from the stimulable phosphor sheet IP.

The sheet holding unit 18 is disposed downstream of the erasing unit 16. The sheet holding unit 18 has a feed path bent around rollers 70, 72, and includes first through third sheet holding zones 74, 76, 78. The sheet holding unit 18 is operatively coupled to the image recording unit 12 through a feed system 80.

Operation of the radiation image information recording and reading apparatus according to the present invention, which is basically of the above structure, will be described below.

There are four stimulable phosphor sheets IP loaded in the radiation image information recording and reading apparatus 10. Desired radiation image information of objects is recorded on each of the stimulable phosphor sheets IP in the image recording unit 12.

As an example, the radiation image information of the entire vertebral column of a patient is recorded as follows:

In the image recording unit 12, the cam 38 of the first engaging mechanism 24 is rotated to bring the support 42 of the swing arm 40 into a horizontal condition, and the cam 54 of the second engaging mechanism 26 is rotated to tilt the swing plate 44 downwardly, as shown in FIG. 2a. Under this condition, the first stimulable phosphor sheet, denoted at IP1, is fed into a receiving position between the front and rear plates 30, 32, and the leading end of the stimulable phosphor sheet IP1 is positioned and supported by the support 42 of the first engaging mechanism 24.

Figure 2B:
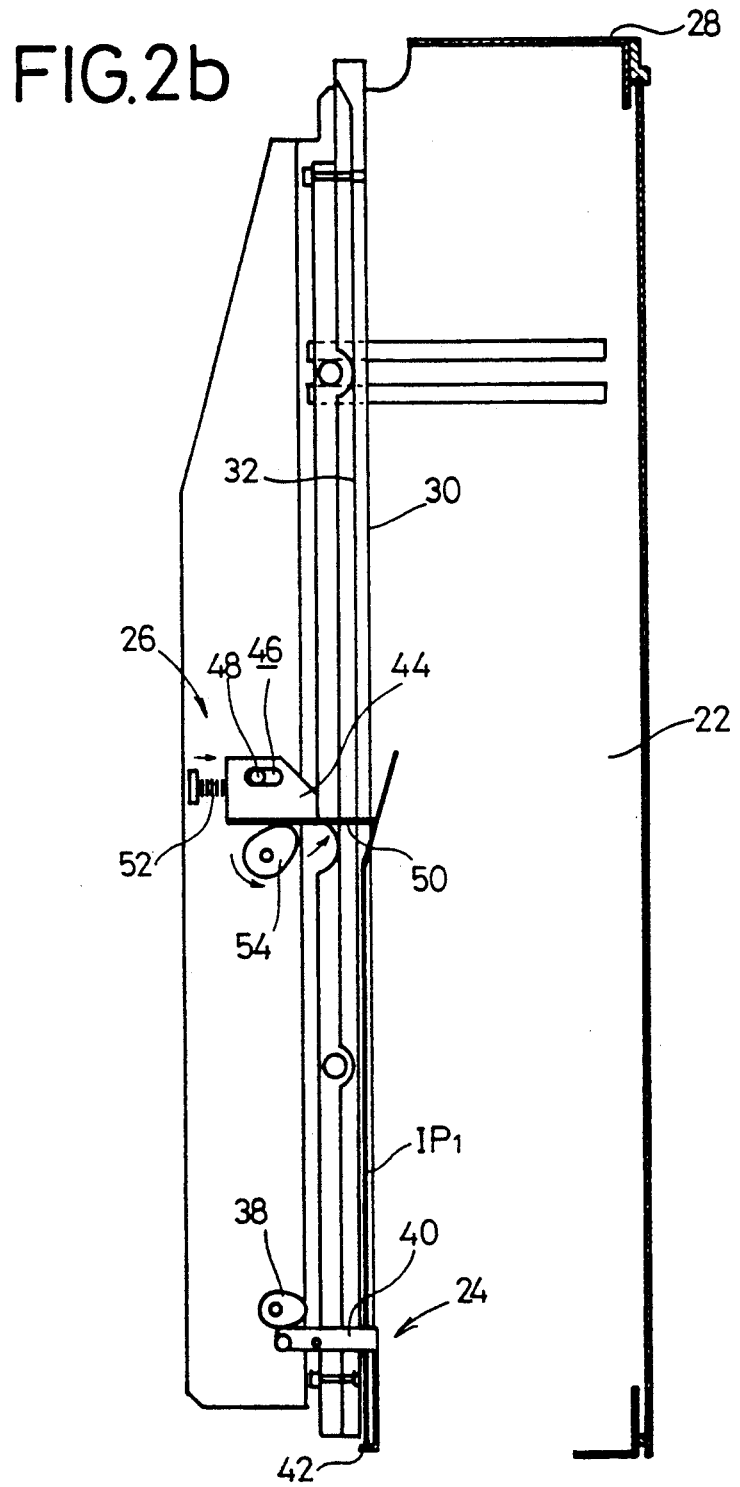

The cam 54 is rotated to cause its cam lobe to lift the support 50 against the bias of the resilient member 52 until the support 50 lies horizontally, whereupon the trailing end of the first stimulable phosphor sheet IP1 is laterally pressed toward the recording position 22 under the bias of the resilient member 52, as shown in FIG. 2b. Then, the second stimulable phosphor sheet, denoted at IP2, is fed by the feed system 80 into the receiving position between the front and rear plates 30, 32, in which the second stimulable phosphor sheet IP2 is supported on the support 50. At this time, the leading end of the second stimulable phosphor sheet IP2 is superimposed on the trailing end of the first stimulable phosphor sheet IP1, as shown in FIG. 2c.

The link mechanism 34 is then actuated to move the first and second stimulable phosphor sheets IP1, IP2, which are disposed between the front and rear plates 30, 32, from the receiving position toward the recording position 22 immediately behind the front wall of the casing 28. The pushed trailing end of the first stimulable phosphor sheet IP1 is engaged by the front wall of the casing 28, displacing back the swing plate 44 against the bias of the resilient member 5 while the swing plate 44 is being guided by the fixed pin 48 and the guide groove 46. The first stimulable phosphor sheet IP1 is now straightened as a whole, as shown in FIG. 2d.

Then, the object whose radiation image information is to be recorded is held against the outer surface of the front wall of the casing 28. An X-ray is emitted from an X-ray source (not shown) and passes through the object, recording the transmitted radiation image information of the vertebral column on the first and second stimulable phosphor sheets IP1, IP2 in the recording position 22.

After the radiation image information has been recorded on the first and second stimulable phosphor sheets IP1, IP2, they are displaced in the direction indicated by the arrow A by the link mechanism 34. Thereafter, the support 42 is angularly moved by the cam 38 to release the leading end of the first stimulable phosphor sheet IP1. The first stimulable phosphor sheet IP1 is no fed to the image reading unit 14 by the feed systems 56, 58.

In the image reading unit 14, a laser beam is applied by the optical unit 64 to the first stimulable phosphor sheet IP1 as it is gripped and fed by the nip rollers 60, 62. Light which is emitted by the first stimulable phosphor sheet IP1 upon exposure to the laser beam and represents the recorded image information is converted into an electric image signal by the transducer unit 66.

After the recorded image information has been read, the first stimulable phosphor sheet IP1 is fed from the image reading unit 14 to the erasing unit 16 in which any residual radiation image information is erased from the first stimulable phosphor sheet IP1. Then, the first stimulable phosphor sheet IP1 is fed into the first sheet holding zone 74 of the sheet holding unit 18, in which the stimulable phosphor sheet IP1 stays ready for recording next radiation image information.

In the image recording unit 12, the swing plate 44 is rotated by the cam 54 to allow the second stimulable phosphor sheet IP2 to move downwardly toward the image reading unit 14. The recorded image information is read from the second stimulable phosphor sheet IP2 in the image reading unit 14 and any residual radiation image information is erased from the second stimulable phosphor sheet IP2 in the erasing unit 16, in the same manner as described above with respect to the first stimulable phosphor sheet IP1.

The electric image signals converted from the radiation image information read from the first and second stimulable phosphor sheets IP1, IP2 are processed so as to combine image portions corresponding to the superimposed portions of the two stimulable phosphor sheets IP1, IP2, with the result that a combined image signal is produced.

While the first and second stimulable phosphor sheets IP1, IP2 are being processed as described above, the other two stimulable phosphor sheets IP are held in the second and third sheet holding zones 76, 78, respectively. These other stimulable phosphor sheets IP are successively fed by the feed system 80 into the image recording unit 12 for recording radiation image information of a new object. If the new object is of such a size that its radiation image information can be recorded on a single stimulable phosphor sheet, then only the stimulable phosphor sheet IP from the third sheet holding zone 78 is held by the second engaging mechanism 26, and positioned in the recording position 22. The radiation image information is recorded on only this stimulable phosphor sheet IP.

In this embodiment, if an object is of a large size, e.g., if it is an entire vertebral column, then it is recorded in a single recording process on two stimulable phosphor sheets IP (i.e., first and second stimulable phosphor sheets IP1, IP2) in the recording position 22, with their confronting ends superimposed on each other. Consequently, the time and effort required by the recording process are about half the time and effort which would otherwise be required to record the entire vertebral column as two successive images on two respective stimulable phosphor sheets IP. Usually, the radiation image information of an entire vertebral column is recorded in two directions. The radiation image information recording and reading apparatus 10 makes it highly efficient to record the radiation image information of an entire vertebral column in such a bidirectional recording practice. The radiation image information reproduced by the radiation image information recording and reading apparatus 10 leads to correct medical diagnosis of the vertebral column as the radiation image information is accurate, free of defects which would otherwise be caused by undesirable movements of the object between successive recording processes.

The radiation image information recording and reading apparatus 10 offers the following advantages:

If a large-size object is to be recorded, the first and second engaging mechanisms 24, 26 position first and second stimulable phosphor sheets IP1, IP2 with their confronting ends superimposed on each other. Therefore, the first and second stimulable phosphor sheets IP1, IP2 jointly record the radiation image information of the large-size object thereon. Since the radiation image information of the large-size object can be recorded in one recording process, the recording process is much more efficient than would be if radiation image information were recorded successively on two stimulable phosphor sheets individually. Inasmuch as the radiation image information recording and reading apparatus 10 solves the problem of image defects which would otherwise result from undesirable movements of the object between successive recording processes, correct medical diagnosis is possible based on the radiation image information reproduced by the radiation image information recording and reading apparatus 10.

Although a certain preferred embodiment has been shown and described, it should be understood that many changes and modifications may be made therein without departing from the scope of the appended claims.

What is claimed is:

1. An apparatus for recording and reading radiation image information, comprising:

a image recording unit for applying radiation bearing radiation image information to a stimulable phosphor sheet to record the radiation image information on said phosphor sheet while said phosphor sheet is located at a recording position;

an image reading unit for applying stimulating light to said phosphor sheet on which the radiation image information has been recorded and for photoelectrically reading resulting light emitted from the stimulable phosphor sheet;

an erasing unit for discharging any residual radiation energy from said phosphor sheet before new radiation image information is recorded on said phosphor sheet and after previous radiation image information has been read by said image reading unit;

a conveyor for feeding a plurality of phosphor sheets circulatively through said image recording unit, said image reading unit, and said erasing unit; and said image recording image having first an engaging portion for engaging one end of a first of said phosphor sheets so as to position said first of said phosphor sheets in said recording position, and a second engaging portion for engaging one end of a second of said phosphor sheets so as to position said second of said phosphor sheets in said recording position while holding a portion of said second stimulable phosphor sheet in superimposed relationship to a portion of said first stimulable phosphor sheet.

2. An apparatus, as claimed in claim 1, wherein said image recording unit includes a displacing mechanism for displacing said phosphor sheets between a receiving position in which said phosphor sheets are received from said conveyor and said recording position in which the radiation is applied to said phosphor sheets, said first and second portions being mounted on said displacing mechanism.

3. An apparatus, as claimed in claim 2, wherein said displacing mechanism comprises a pair of plates for sandwiching said phosphor sheets therebetween, and a link mechanism for moving said plates between said receiving position and said recording position.

4. An apparatus, as claimed in claim 1 or 2, wherein said first engaging portion comprises an actuator, a swing arm pivotable by said actuator, and a support attached to end of said swing arm for supporting said first of said phosphor sheets.

5. An apparatus as claimed in claim 4, wherein said actuator comprises a rotative drive source and a cam rotatable by said rotative drive source and engageable with said swing arm.

6. An apparatus, as claimed in claim 1 or 2, wherein said second engaging portion comprises an actuator, a swing plate angularly movable by said actuator, a support attached to said swing plate for supporting said second of said phosphor sheets, and a resilient member for urging said support to press said portion of said first of said phosphor sheets toward said recording position when said second of said phosphor sheets is supported on said support.

7. An apparatus as claimed in claim 6, wherein said actuator comprises a rotative drive source and a cam rotatable by said rotative drive source and engageable with said swing plate.

* * * * *